Nov. 27, 1928.
R. HENRY
OILLESS SPRING SHACKLE
Original Filed Jan. 15, 1926
1,692,837
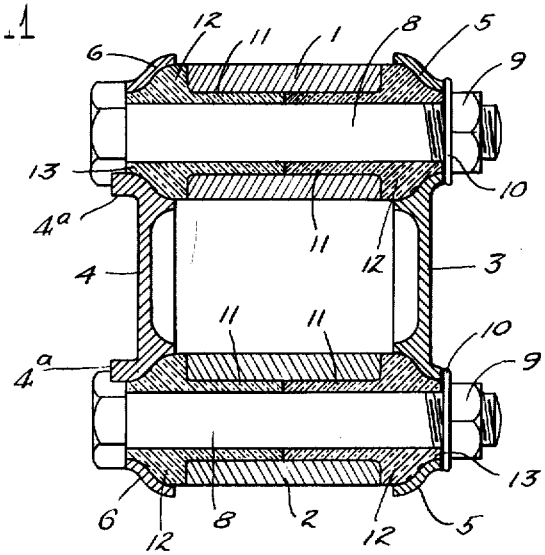
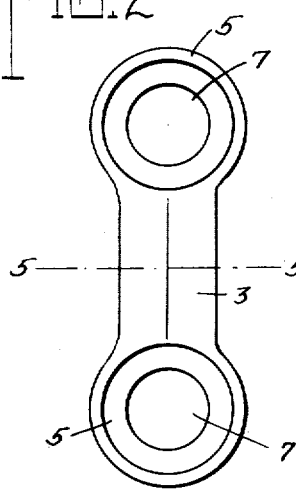
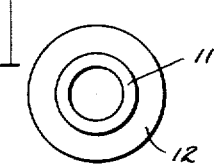
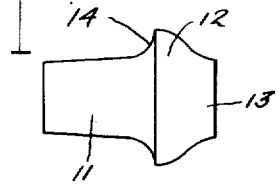
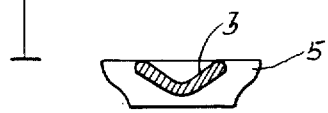
INVENTOR.
Raymond Henry.
BY Walter N. Haskell.
his ATTORNEY.

Patented Nov. 27, 1928.

1,692,837

UNITED STATES PATENT OFFICE.

RAYMOND HENRY, OF ROCK ISLAND, ILLINOIS, ASSIGNOR, BY MESNE ASSIGNMENTS, TO O.-N. SPRING SHACKLE COMPANY, OF DAVENPORT, IOWA, A CORPORATION OF IOWA.

OILLESS SPRING SHACKLE.

Application filed January 15, 1926, Serial No. 81,384. Renewed September 6, 1928.

My invention relates to oscillating joint connections, such for example as spring shackles, and it has to do particularly with oil-less connections or shackles of the general character set forth in my pending application, Serial No. 44,231, filed July 17, 1925, comprising a cylindrical bearing, such as the eye of a spring, a bolt extending through said bearing, an elastic tubular bushing interposed between the bolt and the bearing and adapted to be expanded into tight engagement with the surface of the bolt and the inner face of the bearing, and means, such as the link or links of a spring shackle, co-acting with the bolt to so expand the tubular portion of the bushing. Such a connection does away with the necessity of lubrication, since there is no contact between metallic parts that move relatively to each other, and besides the joint is noiseless.

The object of my present invention is to improve the construction shown and described in my said pending application in various respects, and one of its special features is to provide a construction by which the bushing may be more effectively compressed to cause the radial expansion of its tubular portion within the bearing. Another feature is to provide for extending the bushing outwardly so that it is also interposed between the link or other connecting member and the bolt, thereby insuring against metal to metal contact at the end or ends of the bolt. Another advantage of the latter feature is that it makes it practicable to construct the connecting member or link by a drop forging or similar process instead of drilling openings for the bolt in the links, or doing any other machine work thereon, which materially reduces the cost of manufacture. In this connection it is pointed out that the compression of the bushing effected by drawing together the connecting member or members upon the bolt is sufficient to cause the inner and outer surfaces of the bushing to substantially adhere to the outer surface of the bolt and the inner surface of the bearing respectively. As a result any movement of one of the joint parts with reference to the other is compensated for in the bushing by a torsion action in the material of the bushing itself. The most satisfactory results have been secured by the use of a bushing formed of rubber in a semi-hard state, with tough fibrous material embodied therein. A bushing is thus produced which is sufficiently hard to take the place of a metal bushing, and which possesses the necessary yielding qualities for the purposes for which it is intended.

The above-named, and other features and advantages of the invention will more fully appear from the following specification, taken in connection with the accompanying drawings, in which;

Fig. 1 is a vertical section through the shackle and joints of a spring connection.

Fig. 2 is a side view of the link 3.

Fig. 3 is a detail of one of the bushing sections.

Fig. 4 is an end view thereof.

Fig. 5 is a cross-section on the broken line 5—5 of Fig. 2.

In the drawings I have illustrated my invention as embodied in a spring shackle of the double form commonly used for connecting one end of the spring with the frame of a vehicle, in which there are two connecting members or links arranged to be drawn together by bolts which pass through bearings in the form of eyes, but it should be understood that it may also be applied to other forms of oscillating joints, either double or single.

In Fig. 1 of the drawings is shown a shackle connection embracing two joints, the parts of which are each capable of an oscillating movement with relation to each other, and as the parts of the joints are identical, the reference to one of said joints will be understood to be equally applicable to the other. The bushing is also formed of two parts, for convenience in installing the same, and in the following specification where one of said sections is referred to it will be understood to include the other also.

The reference number 1 indicates a tubular bearing, such as is commonly found on the frame part of a motor vehicle, and 2 is a similar bearing such as is used on the end of a spring in proximity to said frame. At the ends of said bearings are connecting members in the form of links 3 and 4, at the ends of which are circular plates 5 and 6, provided in their inner faces with recesses of substantially conical shape. Said plates are also centrally provided with openings 7 for the passage of bolts 8. on the threaded ends of which are nuts 9, provided on their inner faces with collars 10. These may be separate washers, if desired. Said collars project outwardly a sufficient distance to bear against the plates 5, and the heads of the bolts have a similar bearing against the plates 6. The bolts are held from rotation by means of lugs 4ª on the link 4, in engagement with the heads of the bolts.

Each of the joints shown in said Fig. 1 is provided with a bushing, formed of two similar tubular members or sections 11, on the outer ends of which are frusto-conical heads 12, the outer faces of which conform in shape with the inner walls of the recesses in the plates 5 and 6. The material from which said bushings are made is of a springy, tough character, so as to be both yieldable and wear resisting, and is preferably formed of a semi-hard rubber composition, interspersed with fibrous material, as hereinbefore mentioned. The heads 12 are further projected into circular extensions 13, entering the openings 7 in the link plates, which are made sufficiently large to receive the same. Upon the nut 9 being tightened the heads 12 of the bushing, which are held against radial expansion by the recesses in the plates 5, 6 which form the end portions of the links 3, 4, are compressed, this compression being chiefly along lines at an angle of approximately forty-five degrees with the axial line of the bolt 8. This causes a frictional engagement between the head 12 and plate 5 exteriorly and a similar engagement between said head and the bolt interiorly which results in substantial adhesion of the outer surface of the head 12 to the plate 5, so that there will be no movement of one with relation to the other. The same is true of the inner wall of said head, which adheres tightly to the bolt. As a result any movement of the bolt or link-plate relatively to the other is compensated for by a torsion action of the material of which the head is formed, by reason of the elasticity thereof. A similar effect is produced at the head end of the bolt, between the head 12 and link-plate 6.

A relatively small part of the compressive force above referred to is directed inwardly against the end of the bearing and outwardly through the extension 13, causing an impact of the end of said extension against the nut 9, and assisting in holding the same against accidental turning on the bolt. The compression on the head 12 is also communicated to the tubular portion 11 of the bushing, forcing the same tightly into the space between the bearing and bolt, causing a similar adhesion between the outer face of the bushing and the inner face of the bearing and between the inner face of the bushing and the surface of the bolt, this adhesion being caused by a surface contact, as in the former case. Any movement of one of the parts of the joint with reference to the other is then taken care of by the torsion action of the material of the bushing, as in the former case, said action being in either direction, to conform to the movement of the part. To secure a more positive engagement of the bushing with the adjacent parts the combined length of the tubular members 11 is made a little greater than the length of the bearing, so that upon being compressed said tubular members are forced tightly together at their inner ends, which expands them radially into tight fitting engagement with the outer surface of the bolt and the inner surface of the bearing. Said tubular members are also preferably formed with a slight taper, as shown in Fig. 3, to facilitate their introduction into the openings in the bearings. The bushing is preferably positioned first, after which the links and bolts are assembled and the parts tightened.

The bushing members may also be provided with a fillet, as shown at 14, to add a little to the force of the compression within the bearing.

The connecting plates 3 and 4 of the links are preferably of an angular formation, as shown in Fig. 5, giving greater strength thereto, and doing away with the necessity of making said parts extra heavy or forming the same with reinforcing ribs, as is frequently done with similar parts.

By extending the bushing through the end of the link plate it is possible to form the link and openings in the end thereof by a drop forging method, as hereinbefore mentioned, at a greatly reduced cost of production. As said devices are at present constructed it is necessary to bore the openings in the ends of the links, and otherwise fit them to the bolts, which pass directly through the same, causing a wear of said parts, and consequent looseness thereof. Bolts of a special pattern are also provided, whereas in the present invention it is possible to make use of bolts of a common type, which may be found in stock. It will also be noted that in the present case there is no contact between the bolt and link-plate through which it passes. Holding the bolts against rotation by means of the lugs 4ª as above described is advantageous as it further insures the bolt against turning in the bushing, which would result in wear that would cause the bushing to deteriorate. Also it prevents applying twisting strains to the bushings in tightening up the shackles or other connecting members. As has been explained, the torsional movement in the body of the bushing permits such swinging of the connecting members as is necessary, but even if the bushing should turn in the bearing no harm would result.

What I claim, and desire to secure by Letters Patent, is:

1. A connection of the type described comprising a member having a cylindrical bearing, a bolt extending through said bearing, an elastic tubular bushing interposed between said bolt and said bearing, said bushing having a substantially frusto-conical head at its outer end, and means co-acting with said bolt to apply inward pressure to the inclined face of said head, to press the bushing tightly between the bolt and the bearing.

2. A connection of the type described comprising a member having a cylindrical bearing, a connecting member, a bolt extending through said bearing and supporting said connecting member, an elastic tubular bushing interposed between said bolt and said bearing, said bushing having a substantially frusto-conical head at its outer end adapted to fit in a recess in said connecting member, and means coacting with said bolt to draw said connecting member toward the adjacent end of the bearing.

3. A connection of the type described comprising a member having a cylindrical bearing, a connecting member, a bolt extending through said bearing and the connecting member, an elastic tubular bushing interposed between said bolt and said bearing, said bushing having a substantially frusto-conical head at its outer end adapted to fit in a recess in said connecting member and hold the latter out of contact with the bolt, and means coacting with said bolt to draw said connecting member toward the adjacent end of the bearing.

4. A connection of the type described comprising a member having a cylindrical bearing, a connecting member having a substantially conical recess in its inner face and an opening concentric therewith, a bolt extending through said bearing and said opening, an elastic tubular bushing interposed between said bolt and said bearing, said bushing having a head at its outer end adapted to fit in said recess and to extend into said opening, and means coacting with said bolt to draw said connecting member toward the adjacent end of the bearing.

5. A connection of the type described comprising a member having a cylindrical bearing, a two part bushing composed of elastic tubular members fitted in the opposite end portions of said bearing with their inner ends abutting against each other, said bushing members having substantially frusto-conical heads at their outer ends, a bolt extending through the bushing, connecting members supported by the end portions of the bolt and having recesses in their inner faces adapted to fit upon said heads, and means coacting with said bolt to draw said connecting members toward each other.

6. A connection of the type described comprising a member having a cylindrical bearing, a two part bushing composed of elastic tubular members fitted in the opposite end portions of said bearing with their inner ends abutting against each other, said bushing members having substantially frusto-conical heads at their outer ends, a bolt extending through the bushing, connecting members having openings through which the end portions of the bolt extend, and having recesses in their inner faces adapted to fit upon said heads, said heads extending into said openings, and means coacting with said bolt to draw said connecting members toward each other.

7. A connection of the type described, comprising a member having a cylindrical bearing, a bushing composed of an elastic tubular member fitted in said bearing and having a substantially frusto-conical head at one end adapted to abut at its base against the adjacent end of the bearing, a bolt extending through the bushing, and a recessed member mounted on an end portion of the bolt and having a conical recess adapted to receive and confine the conical face of the head to resist outward expansion thereof when said recessed member is drawn toward the bearing by said bolt.

8. A connection of the type described comprising a member having a cylindrical bearing, a two-part bushing composed of elastic tubular members fitted in the opposite end portions of said bearing and each having a substantially frusto-conical head at its outer end adapted to abut at its base against the adjacent end of the bearing, a bolt extending through the bushing, and recessed members mounted on the end portions of the bolt and having conical recesses adapted to receive and engage the conical faces of said heads to confine said heads and resist outward expansion thereof when said recessed members are drawn together by said bolt.

9. A connection of the type described comprising a member having a cylindrical bearing, a two-part bushing composed of elastic tubular members fitted in the opposite end portions of said bearing and each having a substantially frusto-conical head at its outer end adapted to abut at its base against the adjacent end of the bearing, a bolt extending through the bushing, and recessed members mounted on the end portions of the bolt and having conical recesses adapted to receive and engage the conical faces of said heads to confine said heads and resist outward expansion thereof when said recessed members are drawn together by said bolt, the outer end portions of said heads being extended through said recessed members.

10. A connection of the type described comprising a member having a cylindrical bearing, a two-part bushing composed of elastic tubular members fitted in the opposite end portions of said bearing and abutting against each other, each of said members having a substantially frusto-conical head at its outer end adapted to abut at its base against the adjacent end of the bearing, a bolt extending through the bushing and having a head and a nut adapted to bear respectively against the outer ends of said heads, and members having conical recesses adapted to receive and confine the conical heads of the bushing members and resist outward expansion thereof, said members being arranged to be drawn together by screwing the nut on the bolt.

11. A bushing composed of elastic material and comprising a tubular body portion having a substantially frusto-conical head at one end thereof.

12. A bushing composed of elastic material and comprising a tapered cylindrical body portion having a substantially frusto-conical head at the larger end thereof.

13. A bushing composed of elastic material and comprising a tubular body portion having a substantially frusto-conical head at one end thereof, and a fillet at the juncture of said head and body portion.

14. A connection of the type described comprising a member having a cylindrical bearing, a two-part bushing composed of elastic tubular members fitted in the opposite end portions of said bearing and each having a head at its outer end adapted to abut against the adjacent end of the bearing, a bolt extending through the bushing, and connecting members mounted on the end portions of the bolt and having recesses in their inner faces to receive and confine said heads and resist outward expansion thereof when said connecting members are drawn together by said bolt, said heads being extended axially through said connecting members.

In testimony whereof I affix my signature.

RAYMOND HENRY.

DISCLAIMER 1,692,837.—*Raymond Henry*, Rock Island, Ill. OILLESS SPRING SHACKLE. Patent dated November 27, 1928. Disclaimer filed June 9, 1931, by the assignee, *O.-N. Spring Shackle Company*.

Hereby disclaims claim 11 of said Letters Patent.

[*Official Gazette June 30, 1931.*]

adjacent end of the bearing. a bolt extending through the bushing and having a head and a nut adapted to bear respectively against the outer ends of said heads, and members having conical recesses adapted to receive and confine the conical heads of the bushing members and resist outward expansion thereof, said members being arranged to be drawn together by screwing the nut on the bolt.

11. A bushing composed of elastic material and comprising a tubular body portion having a substantially frusto-conical head at one end thereof.

12. A bushing composed of elastic material and comprising a tapered cylindrical body portion having a substantially frusto-conical head at the larger end thereof.

13. A bushing composed of elastic material and comprising a tubular body portion having a substantially frusto-conical head at one end thereof, and a fillet at the juncture of said head and body portion.

14. A connection of the type described comprising a member having a cylindrical bearing, a two-part bushing composed of elastic tubular members fitted in the opposite end portions of said bearing and each having a head at its outer end adapted to abut against the adjacent end of the bearing, a bolt extending through the bushing, and connecting members mounted on the end portions of the bolt and having recesses in their inner faces to receive and confine said heads and resist outward expansion thereof when said connecting members are drawn together by said bolt, said heads being extended axially through said connecting members.

In testimony whereof I affix my signature.

RAYMOND HENRY.

DISCLAIMER 1,692,837.—*Raymond Henry*, Rock Island, Ill. OILLESS SPRING SHACKLE. Patent dated November 27, 1928. Disclaimer filed June 9, 1931, by the assignee, *O.-N. Spring Shackle Company*.
Hereby disclaims claim 11 of said Letters Patent.
[*Official Gazette June 30, 1931.*]